US009045105B2

(12) United States Patent  (10) Patent No.: US 9,045,105 B2
Khaitan  (45) Date of Patent: Jun. 2, 2015

(54) SEATBELT BUCKLE POSITION HOLDERS

(75) Inventor: Meghan K. Khaitan, Ashburn, VA (US)

(73) Assignee: Buckleright, LLC, Ashburn, VA (US)

( * ) Notice: Subject to any disclaimer, the term of this patent is extended or adjusted under 35 U.S.C. 154(b) by 588 days.

(21) Appl. No.: 13/373,544

(22) Filed: Nov. 18, 2011

(65) Prior Publication Data

US 2013/0126693 A1  May 23, 2013

(51) Int. Cl.
B60R 22/00 (2006.01)
B60R 22/48 (2006.01)
B60R 22/18 (2006.01)
B60R 22/26 (2006.01)

(52) U.S. Cl.
CPC .............. *B60R 22/18* (2013.01); *B60R 22/26* (2013.01); *B60R 2022/1806* (2013.01)

(58) Field of Classification Search
CPC ..................................................... B60R 22/26
USPC ............. 248/220.21, 220.22, 221.11, 222.11, 248/222.12, 225.21; 280/801.1, 808; 296/65.03; 297/482
See application file for complete search history.

(56) References Cited

U.S. PATENT DOCUMENTS

| 3,228,726 | A |   | 1/1966  | Petersen |            |
|-----------|---|---|---------|----------|------------|
| 3,576,346 | A |   | 4/1971  | Hutchinson |          |
| 4,674,303 | A | * | 6/1987  | Salcone, II | 70/63   |
| 4,731,912 | A | * | 3/1988  | Boriskie et al. | 24/633 |
| 4,796,919 | A | * | 1/1989  | Linden | 280/808    |
| 4,987,662 | A | * | 1/1991  | Haffey et al. | 24/633 |
| 5,139,311 | A | * | 8/1992  | Imai et al. | 297/481 |
| 5,189,767 | A | * | 3/1993  | Reitsma | 24/633   |
| 5,529,258 | A | * | 6/1996  | Dybro et al. | 242/374 |
| D396,736  | S | * | 8/1998  | Davis | D2/639     |
| 5,951,112 | A |   | 9/1999  | Hansson |          |
| 6,041,480 | A | * | 3/2000  | White | 24/633     |
| 6,427,935 | B1| * | 8/2002  | Fujii et al. | 242/390.9 |
| 6,832,781 | B2| * | 12/2004 | Rastegar et al. | 280/806 |
| 7,347,500 | B2| * | 3/2008  | Clifton, Jr. | 297/482 |

(Continued)

FOREIGN PATENT DOCUMENTS

EP      1 905 660 A1     4/2008

OTHER PUBLICATIONS

Guest Review: Graco Nautilus Elite Follow-Up at CarseatBlog.com at http://carseatblog.com/7468/guest-review-graco-nautilus-elite-follow-up, last visited May 9, 2011 (13 pages).

(Continued)

*Primary Examiner* — Terrell McKinnon
*Assistant Examiner* — Michael McDuffie
(74) *Attorney, Agent, or Firm* — Edell, Shapiro & Finnan, LLC

(57) ABSTRACT

A seatbelt buckle position holder includes first and second parts each of which has a part of a collar, which is formed when the parts are connected and is configured to support a seatbelt buckle in a position other than against an automobile seat bottom. First and second parts can be identical. Each of the parts can also include a base, which can have a substantially planar shape and can be configured to be placed in a gap formed where an automobile seat bottom encounters an automobile seat back to limit movement of the seatbelt buckle position holder. First and second parts can be adjustably connected to allow various degrees of separation between parts of the collar to accommodate different sizes of seatbelt buckles. A divider can be connected between first and second parts so that the seatbelt buckle holder can be configured to support two seatbelt buckles.

23 Claims, 11 Drawing Sheets

(56) References Cited

U.S. PATENT DOCUMENTS

| | | | |
|---|---|---|---|
| 7,458,636 B2* | 12/2008 | Chen et al. | 297/250.1 |
| 7,648,208 B2 | 1/2010 | Weinstein et al. | |
| 7,648,209 B2 | 1/2010 | Weinstein et al. | |
| 7,862,125 B2 | 1/2011 | Weinstein et al. | |
| 8,037,723 B2* | 10/2011 | Fong | 70/58 |
| 8,215,716 B2* | 7/2012 | Akaike et al. | 297/481 |
| 2003/0177811 A1* | 9/2003 | Grzic | 73/1.15 |
| 2004/0207245 A1* | 10/2004 | Baylis | 297/481 |
| 2004/0227626 A1* | 11/2004 | Almaraz et al. | 340/457.1 |
| 2006/0096069 A1* | 5/2006 | Hoffman | 24/265 BC |
| 2009/0324360 A1* | 12/2009 | Schuech et al. | 411/33 |
| 2012/0187742 A1* | 7/2012 | Betz et al. | 297/480 |

OTHER PUBLICATIONS

History of Child Safety Restraints | Kids Fly Safe—Cares | Kids Fly Safe at http://www.kidsflysafe.com/about-cares/history-of-child-safety-restraints, last visited Oct. 18, 2011 (9 pages).

How Seatbelts Work at HowStuffWorks at http://auto.howstuffworks.com/car-driving-safety/safety-regulatory-device . . . , last visited Oct. 18, 2011 (3 pages).

Infant car seat at http://en.wikipedia.org/wiki/Infant_car_seat, last modified Oct. 18, 2011 (9 pages).

Seat belt at http://en.wikipedia.org/wiki/Seat_belt, last modified Oct. 15, 2011 (15 pages).

Seat belt legislation at http://en.wikipedia.org/wiki/Seat_belt_legislation, last modified Sep. 28, 2011 (9 pages).

* cited by examiner

SEATBELT BUCKLE POSITION HOLDERS

BACKGROUND

In the late 1940s and early 1950s, automobile manufacturers began introducing seatbelts as an option. Generally, a seatbelt includes at least two parts. Each part includes a length of webbing with at least one end firmly attached to an automobile. For one part, a buckle is attached to the other end of the webbing. For the other part, a tongue is attached to the webbing. The buckle includes a groove into which the tongue may be inserted. Internal to the buckle is a male part of a fastener configured to connect to a female part of the fastener on the tongue when the tongue is inserted into the groove. The buckle also includes a release button so that the tongue can be removed from the groove.

Since being introduced, seatbelts have proven to be a highly effective means for avoiding injuries in collisions. The National Highway Traffic and Safety Administration (NHTSA) estimates that approximately 13,000 lives in the United States are saved each year from wearing seatbelts. Sadly, the NHTSA also estimates that approximately 7,000 collision fatalities each year could have been avoided if the victims had been wearing seatbelts.

Although seatbelts, when worn by adults, have proven to be a highly effective means for avoiding injuries in collisions, such seatbelts, sized to be worn by adults, have been found to cause injuries to small children when worn by them. In response to this problem child safety seats were developed. Generally, a child safety seat includes a rigid frame with a padded insert and straps that buckle a child to the frame. Additionally, a child safety seat typically includes means for connecting it to a seatbelt so that the frame is connected to the automobile. In this manner, a child properly buckled into a child safety seat, which itself is properly buckled to a seatbelt, is protected from some injuries in collisions. Since the mid 1980s most states have enacted laws requiring the mandatory wearing of seatbelts and the mandatory use of child safety seats.

Almost since their introduction, one of the problems that has limited the use of seatbelts has been the tendency of the buckle to slide into places where it is not readily visible. For example, often a gap is formed where an automobile seat bottom encounters an automobile seat back and the buckle has had a tendency to slide into the gap. A gap can also exist between two seats. Automobile manufacturers have addressed this issue by shortening the length of the webbing to which the buckle is attached so that it cannot slide into the gap.

Unfortunately, if the use of a short length of webbing has mitigated the problem of locating a buckle in a situation in which the seatbelt will be used by an adult, then it has exacerbated the problem of locating and interacting with the buckle in a situation in which the seatbelt will be used in conjunction with a child safety seat. The bulkiness of a child safety seat can cause it to block the view and reasonable accessibility of the buckle for an adult when the child safety seat is positioned between the adult and the buckle. The bulkiness of a child safety seat can also cause the buckle to be beyond the reach of an arm of a child sitting in the child safety seat. The net result is that the trouble in seeing or reaching the buckle makes the task of buckling a child into a child safety seat an unnecessarily difficult feat. This is particularly the case when more than one child safety seat is used, more than one passenger occupies the automobile seat, or both.

Additionally, many automobiles intended for family use are designed so that at least the seat backs of the rear seats can be folded over so that the rear portion of the automobile can be converted from carrying passengers to carrying goods. To facilitate the folding of these seat backs, many manufacturers have introduced pockets into the seat bottoms. The pockets are configured to hold the seatbelt buckles when the seat backs are folded over. The presence of these pockets can further exacerbate the problem of locating a buckle in a situation in which the seatbelt will be used in conjunction with a child safety seat.

BRIEF DESCRIPTION OF THE DRAWINGS/FIGURES

Figure 1:
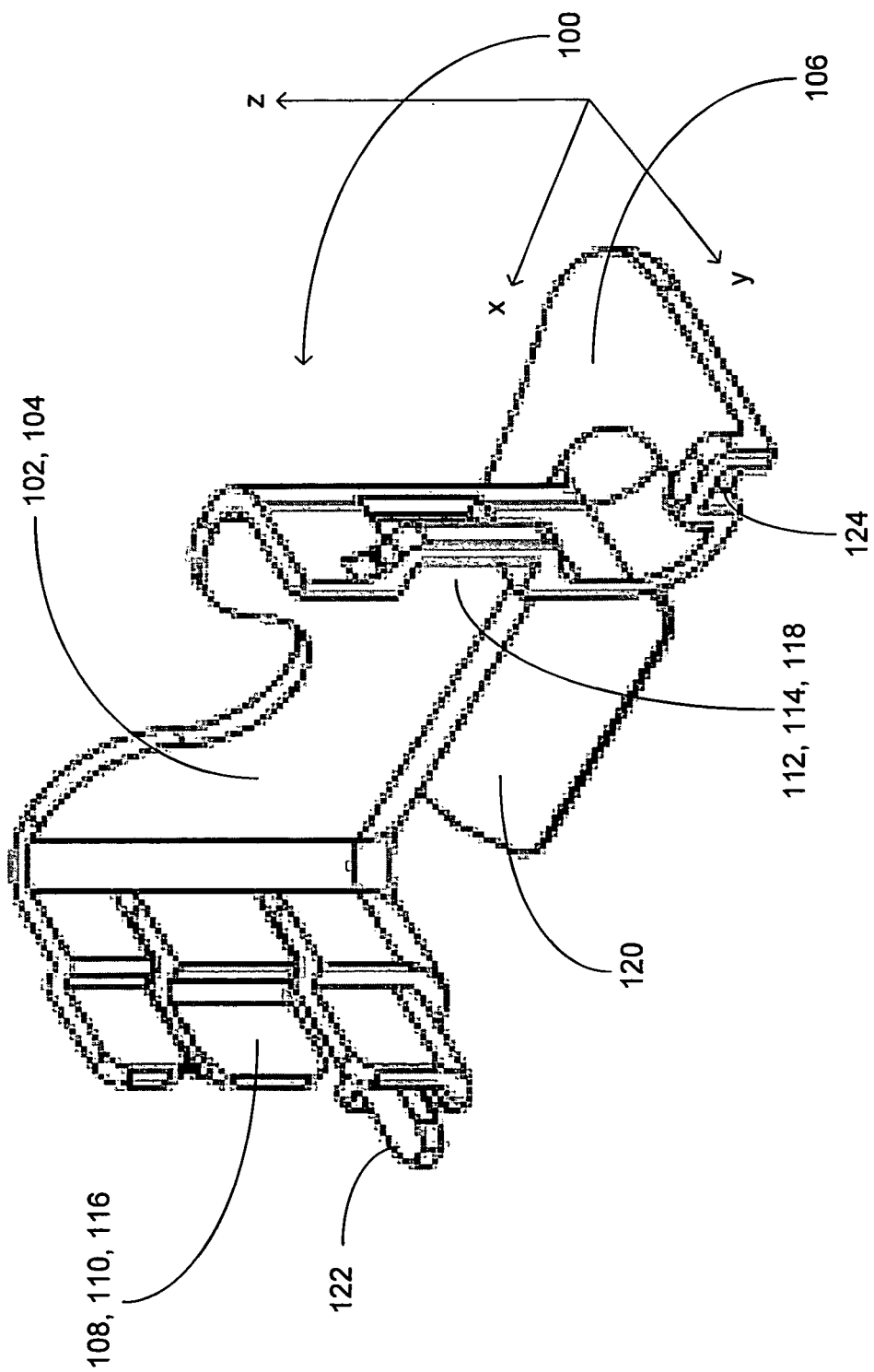
FIGS. 1 through 4 illustrate three dimensional views of seatbelt buckle position holders, according to embodiments.

In the drawings, the leftmost digit(s) of a reference number identifies the drawing in which the reference number first appears.

DETAILED DESCRIPTION

Embodiments of seatbelt buckle position holders are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description.

Although the inspiration for the embodiments of the seatbelt buckle position holders described herein was their intended use in situations in which seatbelts will be used in conjunction with child safety seats, a person skilled in the relevant art will recognize other situations in which the embodiments of the seatbelt buckle position holders described herein can prove beneficial. By way of example only, and not limitation, the embodiments of the seatbelt buckle position holders described herein can be used by: (1) children who have outgrown child safety seats, but may be required to use a booster seat; (2) children who are not required to use a child safety seat or a booster seat, but struggle to buckle a seatbelt without assistance; (3) overweight, disabled, or elderly passengers who lack some mobility of an arm that gives rise to a struggle to buckle a seatbelt; (4) disabled or elderly passengers who have trouble with their vision that give rise to a struggle to buckle a seatbelt; or (5) any passenger or driver sitting in an automobile, seat with a seatbelt buckle configured to interact with one of the embodiments of the seatbelt buckle position holders described herein.

The embodiments of the seatbelt buckle position holders described herein are intended to be an aid for the buckling of a seatbelt. They do not eliminate the responsibility of an adult to buckle properly a child into a child safety seat.

FIGS. 1 through 4 illustrate three dimensional views of seatbelt buckle position holders, according to embodiments.

FIG. 1 illustrates a three dimensional view of a first part of a seatbelt buckle position holder, according to an embodiment. In FIG. 1, a first part 100 includes a first part 102 of a collar 104.

Figure 2:
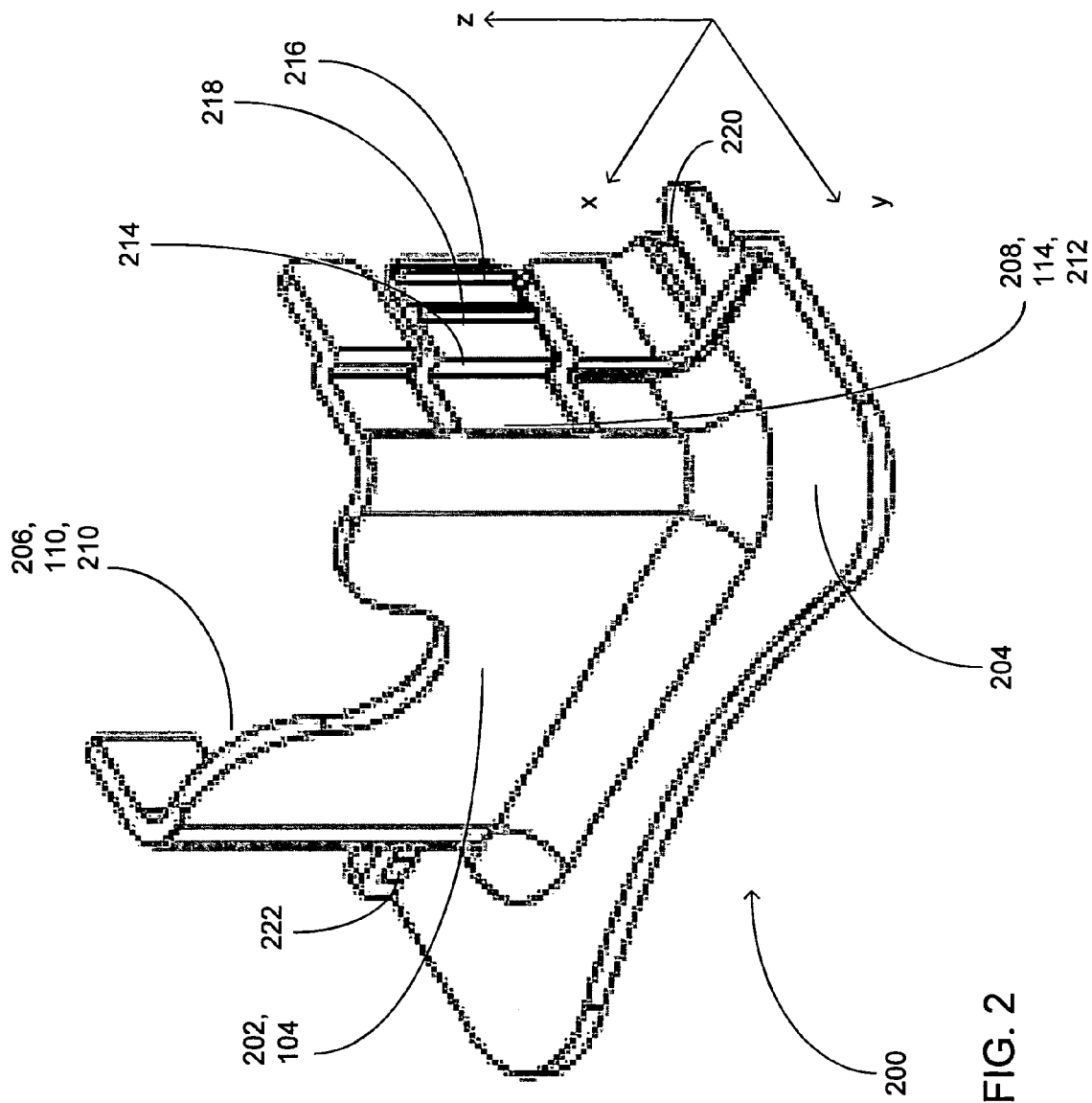

FIG. 2 illustrates a three dimensional view of a second part of a seatbelt buckle position holder, according to an embodiment. In FIG. 2, a second part 200 includes a second part 202 of collar 104.

Figure 3:
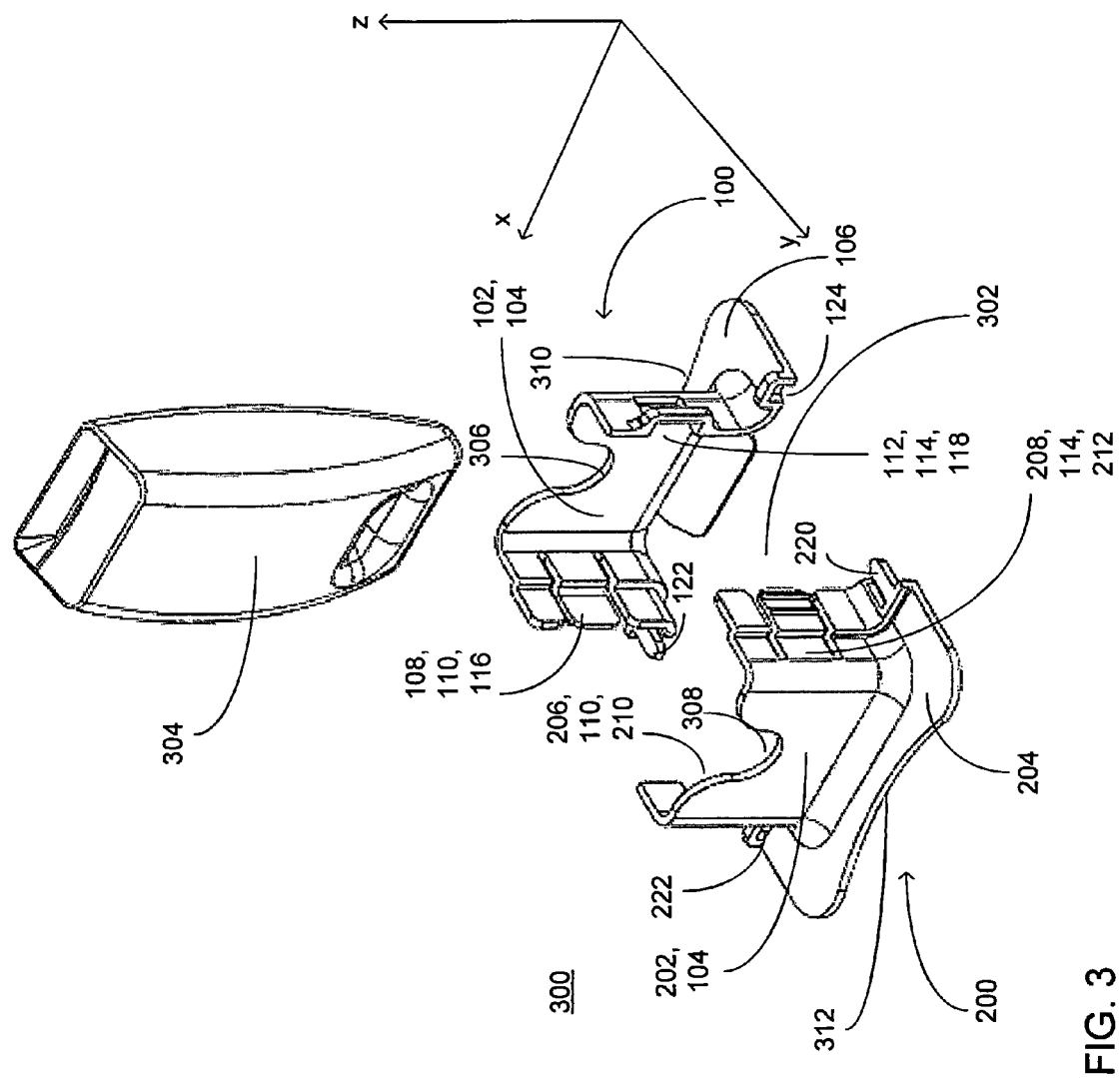

FIG. 3 illustrates a three dimensional view of a seatbelt buckle position holder, according to an embodiment. In FIG. 3, a seatbelt buckle position holder 300 includes first part 100 and second part 200. First part 100 is configured to be connected to second part 200 to form seatbelt buckle position holder 300, which includes collar 104.

First part 100 can be identical to second part 200. Advantageously, having first part 100 identical to second part 200 can reduce the number of tools needed to manufacture seatbelt buckle position holder 300. Advantageously, reducing the number of tools needed to manufacture seatbelt buckle position holder 300 can reduce the cost of manufacturing seatbelt buckle position holder 300. Advantageously, because first part 100 can be identical to second part 200, a user with a broken one of first part 100 or second part 200 can acquire a replacement part without needing to distinguish between first and second parts 100 and 200.

In seatbelt buckle position holder 300, first and second parts 102 and 202 can be shaped to form an aperture 302 surrounded by collar 104. Aperture 302 can be sized to allow a seatbelt webbing (not shown) to pass through. Collar 104 can be configured to support a seatbelt buckle 304. In FIG. 3, for example, seatbelt buckle 304 can have a length (shown substantially parallel to the z-axis), a width (shown substantially parallel to the x-axis), and a thickness (shown substantially parallel to the y-axis). For example, if an automobile seat bottom (not shown) lies substantially parallel to the x-y plane, then collar 104 can be configured to support seatbelt buckle 304 in a position other than against the automobile seat bottom. In FIG. 3, for example, collar 104 can be configured to support seatbelt buckle 304 in a position substantially perpendicular to an automobile seat bottom. Collar 104 can also be configured to support seatbelt buckle 304 in other positions with respect to an automobile seat bottom.

At least one of first and second parts 102 and 202 can be shaped to allow access to a release button (not shown) on seatbelt buckle 304. Sometimes, for example, seatbelt buckle 304 can have a release button on a face that is substantially parallel to the x-z plane. For example, in FIG. 3, first part 102 has a cutaway portion 306 and second part 202 has a cutaway portion 308. At least one of cutaway portions 306 and 308 can allow a user to have access to a release button on seatbelt buckle 304 when seatbelt buckle 304 is being supported by seatbelt buckle position holder 300.

At least one of first and second parts 100 and 200 can further comprise a base. In FIG. 1, for example, a base 106 can be connected to first part 102. Base 106 can have a substantially planar shape. Likewise, in FIG. 2, for example, a base 204 can be connected to second part 202. Base 204 can have a substantially planar shape. Advantageously, at least one of bases 106 and 204 can be positioned to cover one or more pockets (not shown) formed in an automobile seat bottom (not shown). This can prevent seatbelt buckle 304, another seatbelt buckle (not shown), or both from occupying the one or more pockets.

At least one of bases 106 and 204 can be configured to be placed in a gap formed where an automobile seat bottom encounters an automobile seat back (not shown). For example, if an automobile seat bottom lies substantially parallel to the x-y plane and an automobile seat back lies substantially parallel to the x-z plane, then a gap may exist along a line substantially parallel to the x-axis. Base 106, base 204, or both can be placed in the gap.

At least one of bases 106 and 204 can be shaped to avoid an obstruction present in at least one of an automobile seat bottom, an automobile seat back, and the gap. Sometimes, for example, the seatbelt presents such an obstruction. For example, in FIG. 3, base 106 has a cutaway portion 310 and base 204 has a cutaway portion 312. Having each of cutaway portions 310 and 312 positioned near the middle of bases 106 and 204 produces salient portions near the edges of bases 106 and 204. At least one of cutaway portions 310 and 312 can allow seatbelt buckle position holder 300 to be positioned near the obstruction and still can allow salient portions of at least one of bases 106 and 204 to be placed in the gap. Advantageously, because seatbelt buckle position holder 300 comprises first and second parts 100 and 200, base 106 of first part 100, for example, can be placed in the gap near the obstruction so that seatbelt buckle 304 can be positioned between first and second parts 100 and 200 before first and second parts 100 and 200 are connected.

Advantageously, placing at least one of bases 106 and 204 in the gap can limit the ability of seatbelt buckle position holder 300 to rotate about a line substantially parallel to the y-axis. This can contribute to the ability of seatbelt buckle position holder 300 to immobilize seat belt buckle 304. In the absence of the ability to place at least one of bases 106 and 204 in the gap, collar 104 might have to be sufficiently thick enough to limit the ability of seatbelt buckle position holder 300 to rotate about a line substantially parallel to the y-axis. Therefore, advantageously, the ability to place at least one of bases 106 and 204 in the gap can reduce the thickness of collar 104, which can limit the size of seatbelt buckle position holder 300. Advantageously, limiting the size of seatbelt buckle position holder 300 can prevent seatbelt buckle position holder 300 from interfering with other items on the automobile seat bottom, including, by way of example only, and not limitation, other passengers, child safety seats, or both. Advantageously, limiting the size of seatbelt buckle position holder 300 can reduce the amount of material consumed to make seatbelt buckle position holder 300, which can reduce the cost of manufacturing seatbelt buckle position holder 300.

First and second parts 100 and 200 can further comprise at least one first part of at least one fastener and at least one second part of the at least one fastener. The first part of the at least one fastener can be connected to at least one of first part 102 and base 106. The second part of the at least one fastener can be connected to at least one of second part 202 and base 204. In FIG. 1, for example, a first part 108 of a first fastener 110 and a first part 112 of a second fastener 114 can be connected to first part 102. Likewise, in FIG. 2, for example, a second part 206 of first fastener 110 and a second part 208 of second fastener 114 can be connected to second part 202.

At least one of first and second fasteners 110 and 114 can be any means that connect first and second parts 100 and 200 including, by way of example only, and not limitation, adhesive means, a band, a strap, a staple, a screw, a pin, a nail, a peg, a grommet, a clip, a rivet, a clutch, a snap fastener, a buckle, a button, a frog, a lace, a tie, a zipper, a hinge, a clamshell, a retainer ring, a hook-and-eye closure, a hook-and-loop fastener (e.g., Velcro®), and the like. Advantageously, having both first and second fasteners 110 and 114 can contribute to the robustness of seatbelt buckle position holder 300.

For example, first part 108 can be a male part 116, first part 112 can be a female part 118, second part 206 can be a female part 210, and second part 208 can be a male part 212. Male part 116 can be configured to connect to female part 210 and male part 212 can be configured to connect to female part 118.

(In another embodiment, both first parts 108 and 112 can be male parts and both second parts 206 and 208 can be female parts, or vice versa.)

Male part 212 can have a portion 214 substantially elongated along an axis. In FIG. 2, for example, portion 214 is substantially elongated along a line substantially parallel to the y-axis. Portion 214 can have a first protrusion 216 substantially perpendicular to the axis. In FIG. 2, for example, first protrusion 216 protrudes from portion 214 substantially along a line substantially parallel to the x-axis, which is perpendicular to the y-axis. First protrusion 216 can have an original shape and can be made of an elastic material that is configured to compress when first protrusion 216 is passed through female part 118 and to expand to the original shape after first protrusion 216 has passed through female part 118.

If the original shape of first protrusion 216 has a cross sectional area in a plane substantially parallel to the x-z plane that is larger than a cross sectional area in a plane substantially parallel to the x-z plane of female part 118, then having first protrusion 216 expand to the original shape after first protrusion 216 has passed through female part 118 can connect male part 212 to female part 118 and, in turn, first part 100 to second part 200 to form seatbelt buckle position holder 300. Male part 116 can be configured in a similar manner as male part 212 so that male part 116 can be made to connect to female part 210.

Male part 212 can be releasable from female part 118. For example, having first protrusion 216 compress when first protrusion 216 is passed through female part 118 in the reverse direction can allow male part 212 to be separated from female part 118. Likewise, male part 116 can be releasable from female part 210. In this manner, first part 100 can be separated from second part 200. Advantageously, the ability to separate first part 100 from second part 200 can allow for first and second parts 100 and 200 to be used in a variety of configurations.

First part 108 can be adjustably connected to second part 206 to allow various degrees of separation between first and second parts 102 and 202 when first part 100 is connected to second part 200. Likewise, second part 208 can be adjustably connected to first part 112 to allow various degrees of separation between first and second parts 102 and 202 when first part 100 is connected to second part 200. Portion 214 can have more than one protrusion. In FIG. 2, for example, in addition to first protrusion 216, portion 214 can have a second protrusion 218. Second protrusion 218 can be configured in a manner similar to first protrusion 216. Advantageously, having more than one protrusion can allow male part 212 to be adjustably connected to female part 118 to allow various degrees of separation between first and second parts 102 and 202 when first part 100 is connected to second part 200. In this manner seatbelt buckle position holder 300 can be adjusted to accommodate different sizes of seatbelt buckle 304, particularly different thicknesses of seatbelt buckle 304.

At least one of first and second parts 100 and 200 can further comprise a flap. In FIG. 1, for example, a flap 120 can be connected to at least one of first part 102 and base 106. Flap 120 can be configured to help support seatbelt buckle 304. A similar flap (not shown) can also be connected to at least one of second part 202 and base 204. Optionally, flap 120 can have a textured surface (not shown) configured to help support seatbelt buckle 304. The textured surface can include at least one protrusion (not shown) substantially perpendicular to a plane of flap 120. The at least one protrusion can be configured to contact a seatbelt webbing (not shown) on one side. The similar flap (not shown) can have a textured surface (not shown) that can include at least one protrusion (not shown) substantially perpendicular to a plane of the similar flap and configured to contact the seatbelt webbing on the other side. In this manner, the at least one protrusion of flap 120 and the similar flap can be configured to hold the seatbelt webbing.

First and second parts 100 and 200 can further comprise at least one pin and at least one socket. In FIG. 1, for example, a pin 122 and a socket 124 can be connected to base 106. Likewise, in FIG. 2, for example, a pin 220 and a socket 222 can be connected to base 204. Pin 122 can be configured to engage with socket 222 when first part 100 is connected to second part 200. Likewise, pin 220 can be configured to engage with socket 124 when first part 100 is connected to second part 200. Advantageously, pin 122 and socket 222 can contribute to the robustness of seatbelt buckle position holder 300. Likewise, advantageously, pin 220 and socket 124 can contribute to the robustness of seatbelt buckle position holder 300.

Figure 4:
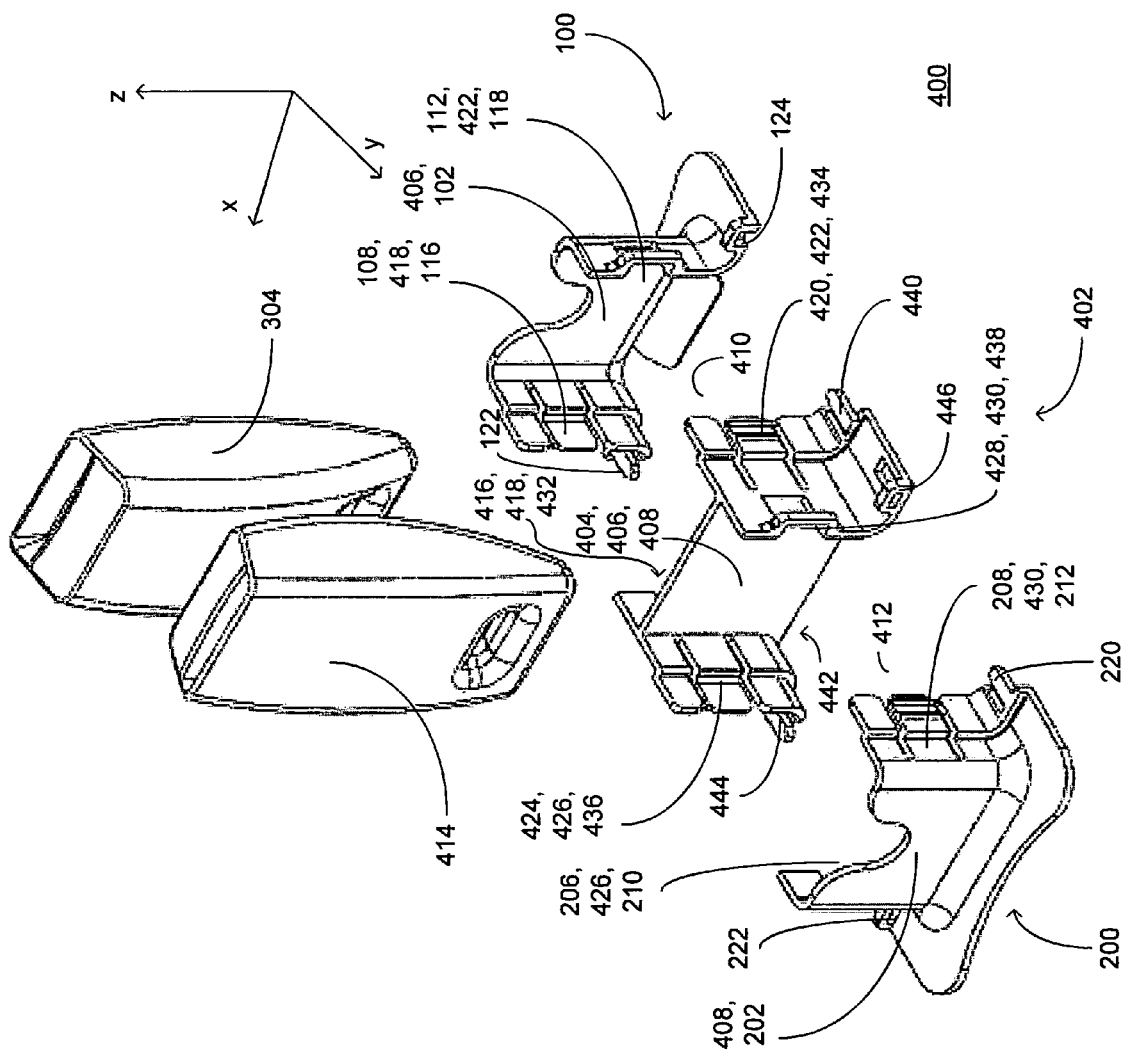

FIG. 4 illustrates a three dimensional view of a seatbelt buckle position holder, according to an embodiment. In FIG. 4, a seatbelt buckle position holder 400 includes first part 100, second part 200, and a divider 402. Divider 402 is configured to be connected to first and second parts 100 and 200 to form seatbelt buckle position holder 400. Divider 402 includes a common part 404 of a first collar 406 and a second collar 408.

In seatbelt buckle position holder 400, first part 102 and common part 404 can be shaped to form an aperture 410 surrounded by first collar 406. Aperture 410 can be sized to allow a seatbelt webbing (not shown) to pass through. First collar 406 can be configured to support seatbelt buckle 304. For example, if an automobile seat bottom (not shown) lies substantially parallel to the x-y plane, then first collar 406 can be configured to support seatbelt buckle 304 in a position other than against the automobile seat bottom. In FIG. 4, for example, first collar 406 can be configured to support seatbelt buckle 304 in a position substantially perpendicular to an automobile seat bottom. First collar 406 can also be configured to support seatbelt buckle 304 in other positions with respect to an automobile seat bottom.

In seatbelt buckle position holder 400, second part 202 and common part 404 can be shaped to form an aperture 412 surrounded by second collar 408. Aperture 412 can be sized to allow a seatbelt webbing (not shown) to pass through. Second collar 408 can be configured to support a seatbelt buckle 414. For example, if an automobile seat bottom (not shown) lies substantially parallel to the x-y plane, then second collar 408 can be configured to support seatbelt buckle 414 in a position other than against the automobile seat bottom. In FIG. 4, for example, second collar 408 can be configured to support seatbelt buckle 414 in a position substantially perpendicular to an automobile seat bottom. Second collar 408 can also be configured to support seatbelt buckle 414 in other positions with respect to an automobile seat bottom.

In this manner, seatbelt buckle position holder 400 is configured to support adjacent seatbelt buckles 304 and 414.

Divider 402 can further comprise at least one part of at least one first fastener and at least one part of at least one second fastener. The at least one part of the at least one first fastener and the at least one part of the at least second fastener can be connected to common part 404. In FIG. 4, for example, a part 416 of a first fastener 418, a part 420 of a second fastener 422, a part 424 of a third fastener 426, and a part 428 of a fourth fastener 430 can be connected to common part 404.

At least one of first fastener 418, second fastener 422, third fastener 426, and fourth fastener 430 can be any means that connect first part 100, second part 200, and divider 402 including, by way of example only, and not limitation, adhesive means, a band, a strap, a staple, a screw, a pin, a nail, a peg, a grommet, a clip, a rivet, a clutch, a snap fastener, a buckle, a button, a frog, a lace, a tie, a zipper, a hinge, a clamshell, a retainer ring, a hook-and-eye closure, a hook-and-loop fastener (e.g., Velcro®), and the like. Advantageously, having all of first fastener 418, second fastener 422, third fastener 426, and fourth fastener 430 can contribute to the robustness of seatbelt buckle position holder 400.

For example, part 416 can be a female part 432, part 420 can be a male part 434, part 424 can be a male part 436, and part 428 can be a female part 438. Female part 432 can be configured to be connected to male part 116, male part 434 can be configured to be connected to female part 118, male part 436 can be configured to be connected to female part 210, and female part 438 can be configured to be connected to male part 212. Male part 434 can be configured in a similar manner as male part 212. Male part 436 can be configured in a similar manner as male part 212. (In another embodiment, both parts 416 and 420 can be female parts and both second parts 424 and 428 can be male parts, or vice versa.)

First part 108 can be adjustably connected to part 416 to allow various degrees of separation between first part 102 and common part 404 when first part 100 is connected to divider 402. Likewise, part 420 can be adjustably connected to first part 112 to allow various degrees of separation between first part 102 and common part 404 when first part 100 is connected to divider 402. Likewise, second part 208 can be adjustably connected to part 428 to allow various degrees of separation between second part 202 and common part 404 when second part 200 is connected to divider 402. Likewise, part 424 can be adjustably connected to second part 206 to allow various degrees of separation between second part 202 and common part 404 when second part 200 is connected to divider 402. In this manner seatbelt buckle position holder 400 can be adjusted to accommodate different sizes of seatbelt buckles 304 and 414, particularly different thicknesses of seatbelt buckles 304 and 414.

Divider 402 can further comprise at least one pin and at least one socket. In FIG. 4, for example, a pin 440, a socket 442 (not shown), a pin 444, and a socket 446 can be connected to common part 404. Pin 440 can be configured to engage with socket 124 and pin 122 can be configured to engage with socket 442 when first part 100 is connected to common part 404. Likewise, pin 444 can be configured to engage with socket 222 and pin 220 can be configured to engage with socket 446 when second part 200 is connected to common part 404. Advantageously, pin 440 and socket 124 can contribute to the robustness of seatbelt buckle position holder 400. Likewise, advantageously, pin 122 and socket 442 can contribute to the robustness of seatbelt buckle position holder 400. Likewise, advantageously, pin 444 and socket 222 can contribute to the robustness of seatbelt buckle position holder 400. Likewise, advantageously, pin 220 and socket 446 can contribute to the robustness of seatbelt buckle position holder 400.

FIGS. 5 through 8 illustrate top views of a seatbelt buckle position holder, according to embodiments.

Figure 5:
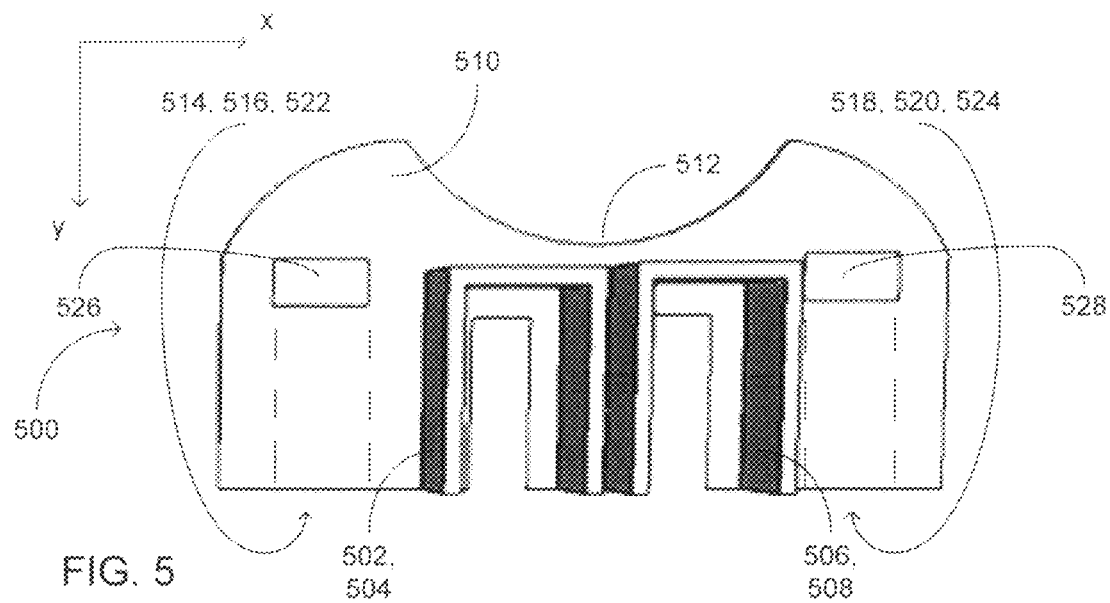
FIGS. 5 through 8 illustrate top views of a seatbelt buckle position holder, according to embodiments.

FIG. 5 illustrates a three dimensional view of a first part of a seatbelt buckle position holder, according to an embodiment. In FIG. 5, a first part 500 includes a first part 502 of a first collar 504. First part 500 can further comprise a first part 506 of a second collar 508.

Figure 6:
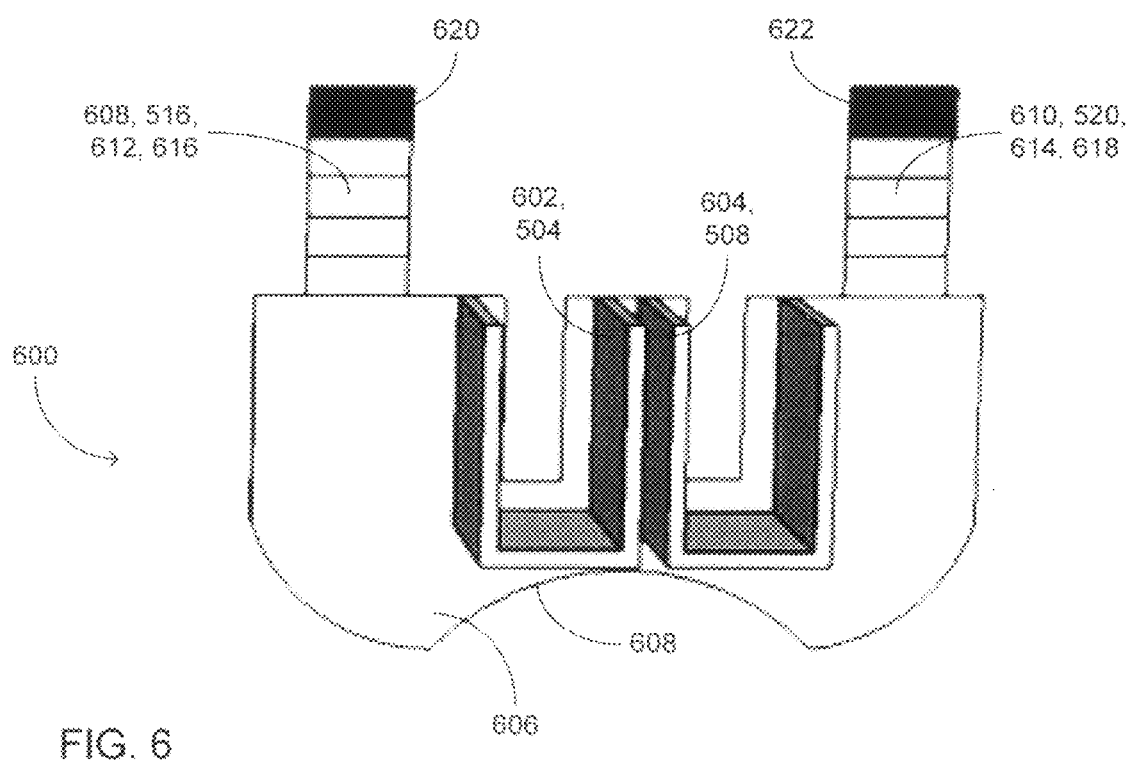

FIG. 6 illustrates a three dimensional view of a second part of a seatbelt buckle position holder, according to an embodiment. In FIG. 6, a second part 600 includes a second part 602 of first collar 504. Second part 600 can further comprise a second part 604 of second collar 508.

Figure 7:
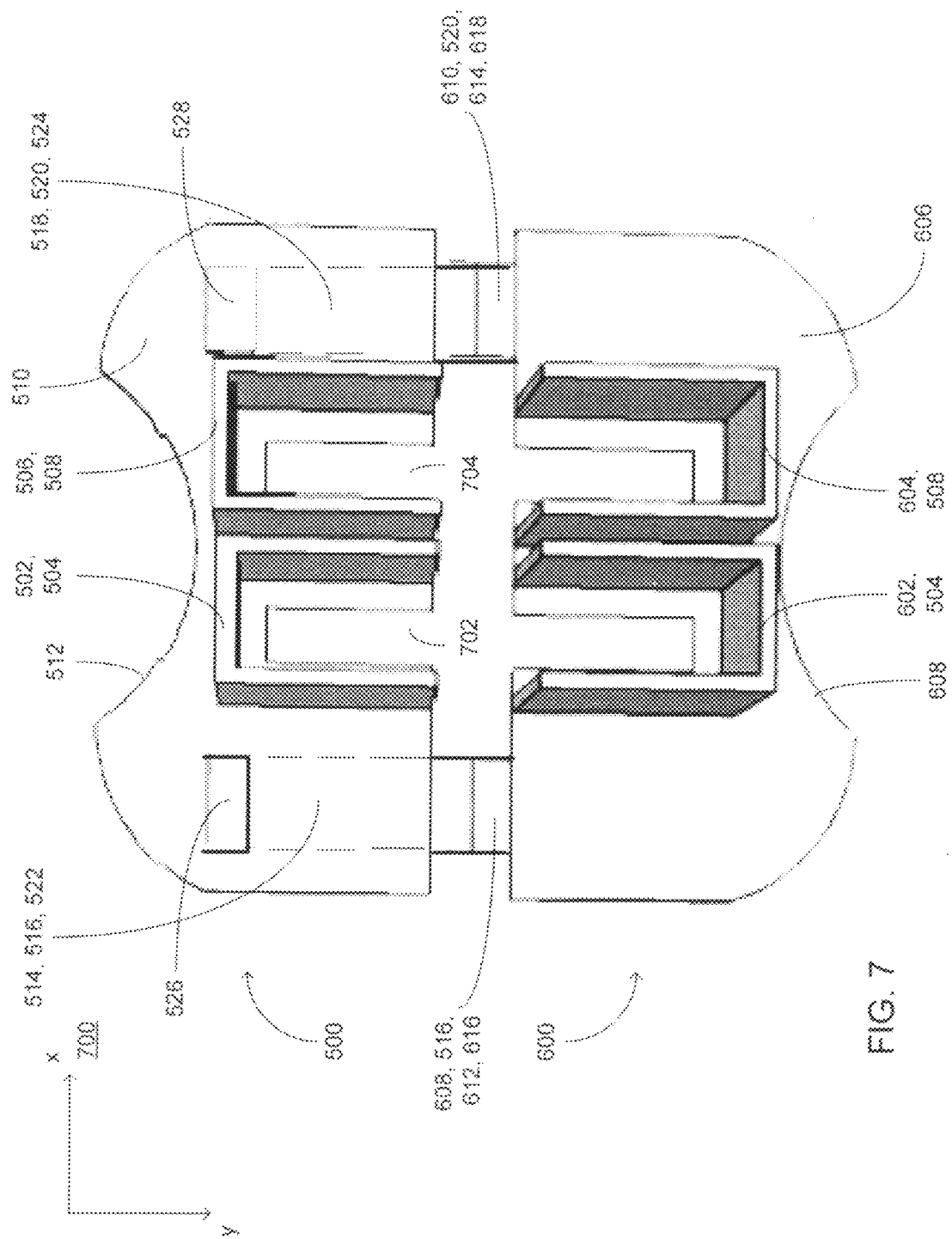
Figure 8:
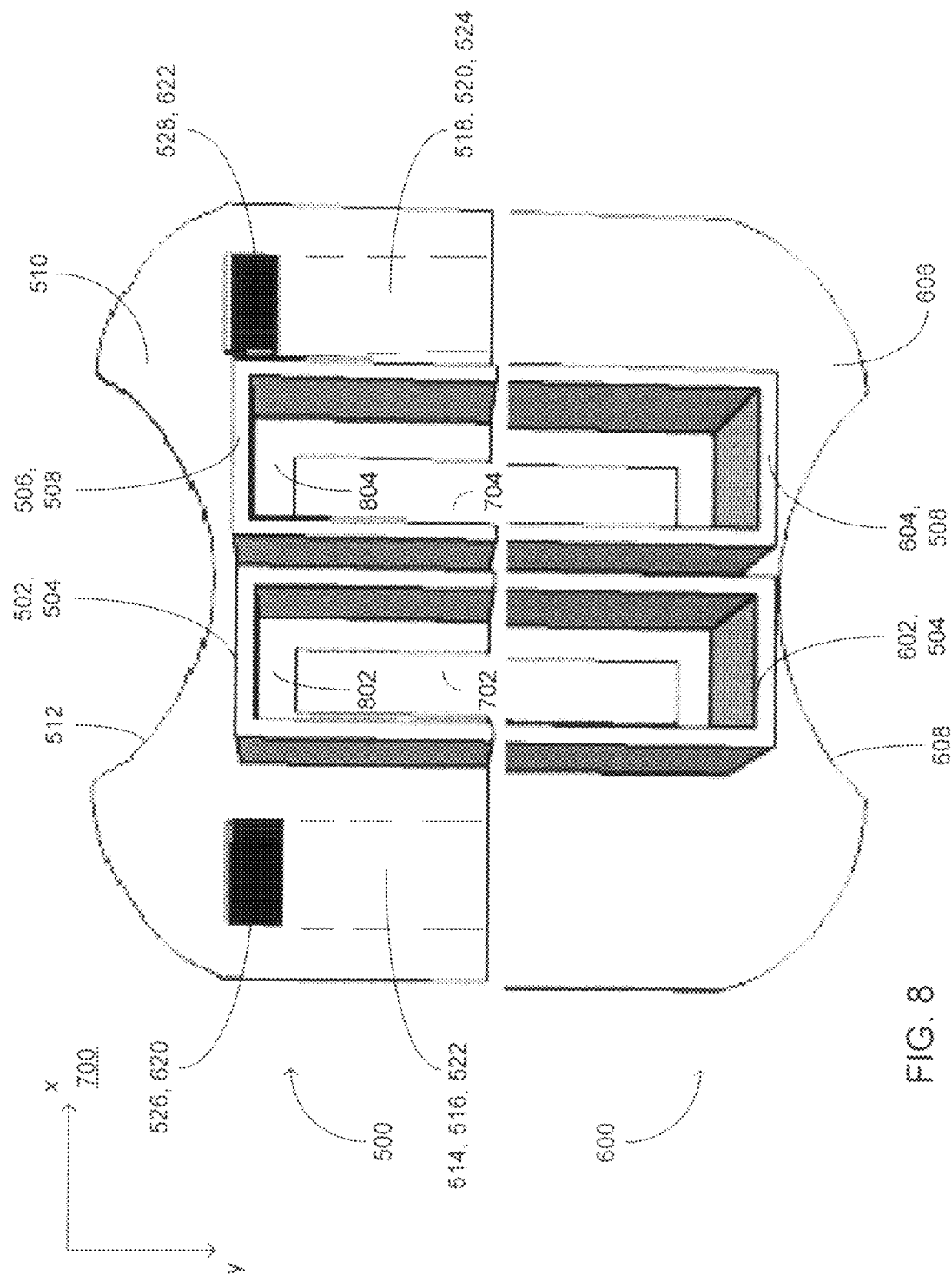

FIG. 7 illustrates a three dimensional view of a partially assembled seatbelt buckle position holder, according to an embodiment. FIG. 8 illustrates a three dimensional view of a fully assembled seatbelt buckle position holder, according to an embodiment. In FIGS. 7 and 8, a seatbelt buckle position holder 700 includes first part 500 and second part 600. First part 500 is configured to be connected to second part 600 to form seatbelt buckle position holder 700, which includes first collar 504. Seatbelt buckle position holder 700 can further include second collar 508.

In seatbelt buckle position holder 700, first and second parts 502 and 602 can be shaped to form an aperture 702 surrounded by collar 504. Aperture 702 can be sized to allow a seatbelt webbing (not shown) to pass through. Collar 504 can be configured to support, for example, seatbelt buckle 414. For example, if an automobile seat bottom (not shown) lies substantially parallel to the x-y plane, then collar 504 can be configured to support seatbelt buckle 414 in a position other than against the automobile seat bottom. In FIG. 8, for example, collar 504 can be configured to support seatbelt buckle 414 in a position substantially perpendicular to an automobile seat bottom (not shown). Collar 504 can also be configured to support seatbelt buckle 414 in other positions with respect to an automobile seat bottom.

Likewise, in seatbelt buckle position holder 700, first and second parts 506 and 604 can be shaped to form an aperture 704 surrounded by collar 508. Aperture 704 can be sized to allow a seatbelt webbing (not shown) to pass through. Collar 508 can be configured to support, for example, seatbelt buckle 304. For example, if an automobile seat bottom (not shown) lies substantially parallel to the x-y plane, then collar 508 can be configured to support seatbelt buckle 304 in a position other than against the automobile seat bottom. In FIG. 8, for example, collar 508 can be configured to support seatbelt buckle 304 in a position substantially perpendicular to an automobile seat bottom (not shown). Collar 508 can also be configured to support seatbelt buckle 304 in other positions with respect to an automobile seat bottom.

At least one of first and second parts 502 and 602 can be shaped to allow access to a release button (not shown) on seatbelt buckle 414. For example, in FIG. 3, sometimes seatbelt buckle 414 can have a release button on a face that is substantially parallel to the x-z plane. For example, first part 502 can have a cutaway portion (not shown) similar to cutaway portion 306 on first part 102. For example, second part 602 can have a cutaway portion (not shown) similar to cutaway portion 308 on second part 202. At least one of these cutaway portions can allow a user to have access to a release button on seatbelt buckle 414, for example, when seatbelt buckle 414 is being supported by seatbelt buckle position holder 700.

Likewise, at least one of first and second parts 506 and 604 can be shaped to allow access to a release button (not shown) on seatbelt buckle 304. For example, in FIG. 3, sometimes seatbelt buckle 304 can have a release button on a face that is substantially parallel to the x-z plane. For example, first part 506 can have a cutaway portion (not shown) similar to cutaway portion 306 on first part 102. For example, second part 604 can have a cutaway portion (not shown) similar to cutaway portion 308 on second part 202. At least one of these cutaway portions can allow a user to have access to a release button on seatbelt buckle 304, for example, when seatbelt buckle 304 is being supported by seatbelt buckle position holder 700.

At least one of first and second parts 500 and 600 can further comprise a base. In FIG. 5, for example, a base 510 can be connected to first part 502. Base 510 can have a substantially planar shape. Likewise, in FIG. 6, for example, a base 606 can be connected to second part 602. Base 606 can have a substantially planar shape. Advantageously, at least one of bases 510 and 606 can be positioned to cover one or more pockets (not shown) formed in an automobile seat bottom (not shown). This can prevent seatbelt buckle 304, seatbelt buckle 414, or both from occupying the one or more pockets.

At least one of bases 510 and 606 can be configured to be placed in a gap formed where an automobile seat bottom (not shown) encounters an automobile seat back (not shown). For example, in FIG. 3, if an automobile seat bottom lies substantially parallel to the x-y plane and an automobile seat back lies substantially perpendicular to the x-y plane and substantially parallel to the x-axis, then a gap may exist along a line substantially parallel to the x-axis. Base 510, base 606, or both can be placed in the gap.

At least one of bases 510 and 606 can be shaped to avoid an obstruction present in at least one of an automobile seat bottom, an automobile seat back, and the gap. Sometimes, for example, the seatbelt presents such an obstruction. For example, in FIG. 5, base 510 has a cutaway portion 512. For example, in FIG. 6, base 606 has a cutaway portion 608. Having each of cutaway portions 512 and 608 positioned near the middle of bases 510 and 606 produces salient portions near the edges of bases 510 and 606. At least one of cutaway portions 512 and 608 can allow seatbelt buckle position holder 700 to be positioned near the obstruction and still can allow salient portions of at least one of bases 512 and 608 to be placed in the gap. Advantageously, because seatbelt buckle position holder 700 comprises first and second parts 500 and 600, base 510 of first part 500, for example, can be placed in the gap near the obstruction so that at least one of seatbelt buckles 414 and 304 can be positioned between first and second parts 500 and 600 before first and second parts 500 and 600 are connected.

First and second parts 500 and 600 can further comprise at least one first part of at least one fastener and at least one second part of the at least one fastener. The first part of the at least one fastener can be connected to at least one of first part 502, first part 506, and base 510. The second part of the at least one fastener can be connected to at least one of second part 602, second part 604 and base 606. In FIG. 5, for example, a first part 514 of a first fastener 516 and a first part 518 of a second fastener 520 can be connected to base 510. Likewise, in FIG. 6, for example, a second part 608 of first fastener 516 and a second part 610 of second fastener 520 can be connected to base 606.

At least one of first and second fasteners 516 and 520 can be any means that connect first and second parts 500 and 600 including, by way of example only, and not limitation, adhesive means, a band, a strap, a staple, a screw, a pin, a nail, a peg, a grommet, a clip, a rivet, a clutch, a snap fastener, a buckle, a button, a frog, a lace, a tie, a zipper, a hinge, a clamshell, a retainer ring, a hook-and-eye closure, a hook-and-loop fastener (e.g., Velcro®), and the like. Advantageously, having both first and second fasteners 516 and 520 can contribute to the robustness of seatbelt buckle position holder 700.

For example, first part 514 can be a female part 522, first part 518 can be a female part 524, second part 608 can be a male part 612, and second part 610 can be a male part 614. Male part 612 can be configured to connect to female part 522 and male part 614 can be configured to connect to female part 524. (In another embodiment, first part 514 can be a female pait, first part 518 can be a male part, second part 608 can be a male part, and second part 610 can be a female part, or vice versa.)

Male part 612 can have a portion 616 substantially elongated along an axis. Likewise, male part 614 can have a portion 618 substantially elongated along the axis. In FIG. 6, for example, portions 616 and 618 are substantially elongated along a line substantially parallel to the y-axis. Portion 616 can have a protrusion 620 substantially perpendicular to the axis. Likewise, portion 618 can have a protrusion 622 substantially perpendicular to the axis. In FIG. 6, for example, protrusion 620 protrudes from portion 616 substantially along a line substantially parallel to the x-axis, which is perpendicular to the y-axis. Likewise, in FIG. 6, for example, protrusion 622 protrudes from portion 618 substantially along a line substantially parallel to the x-axis, which is perpendicular to the y-axis.

Protrusion 620 can have an original shape and can be made of an elastic material that is configured to compress when protrusion 620 is passed through female part 522 and to expand to the original shape after protrusion 620 has passed through female part 522. Base 510 can include a hole 526 so that protrusion 620 can expand to the original shape after protrusion 620 has passed through female part 522. FIG. 8, for example, illustrates protrusion 620 having expanded to the original shape in hole 526 after protrusion 620 has passed through female part 522.

Likewise, protrusion 622 can have an original shape and can be made of an elastic material that is configured to compress when protrusion 622 is passed through female part 524 and to expand to the original shape after protrusion 622 has passed through female part 524. Base 510 can include a hole 528 so that protrusion 622 can expand to the original shape after protrusion 622 has passed through female part 524. FIG. 8, for example, illustrates protrusion 622 having expanded to the original shape in hole 528 after protrusion 622 has passed through female part 524.

If the original shape of protrusion 620 has a cross sectional area in a plane substantially perpendicular to the x-y plane and substantially parallel to the x-axis that is larger than a cross sectional area in a plane of female part 522 substantially perpendicular to the x-y plane and substantially parallel to the x-axis, then having protrusion 620 expand to the original shape after protrusion 620 has passed through female part 522 can connect male part 612 to female part 522 and, in turn, first part 500 to second part 600 to form seatbelt buckle position holder 700. Male part 614 can be configured in a similar manner as male part 612 so that male part 614 can be made to connect to female part 524.

Male part 612 can be releasable from female part 522. For example, having protrusion 620 compress when protrusion 620 is passed through female part 522 in the reverse direction can allow male part 612 to be separated from female part 522. Likewise, male part 614 can be releasable from female part 524. In this manner, first part 500 can be separated from second part 600.

At least one of the pair of first and second parts 502 and 602 and the pair of first and second parts 506 and 604 can be positioned on bases 510 and 606 to form a flange. In FIG. 8, for example, a flange 802 can be formed by a position of first and second parts 502 and 602 on bases 510 and 606. Likewise, in FIG. 8, for example, a flange 804 can be formed by a position of first and second parts 506 and 604 on bases 510 and 606. Flange 802 can reduce the size of aperture 702 to allow a seatbelt webbing (not shown) to pass through, but to prevent seatbelt buckle 414, for example, from passing through. Flange 802 can be configured to support seatbelt buckle 414. Likewise, flange 804 can reduce the size of aperture 704 to allow a seatbelt webbing (not shown) to pass through, but to prevent seatbelt buckle 304, for example, from passing through. Flange 804 can be configured to support seatbelt buckle 304.

Figure 9:
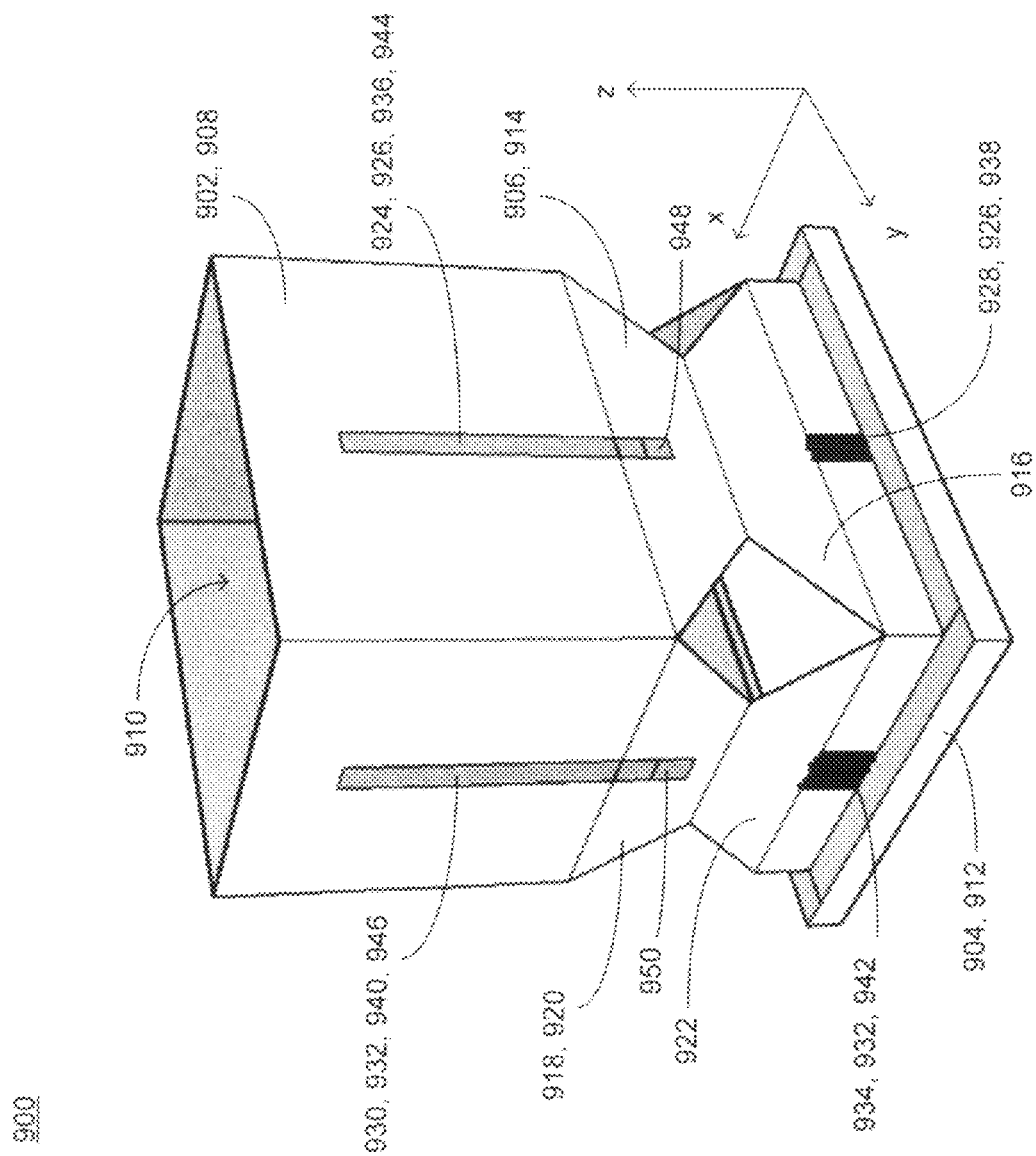
FIGS. 9 through 11 illustrate three dimensional views of a seatbelt buckle position holder, according to embodiments.
Figure 10:
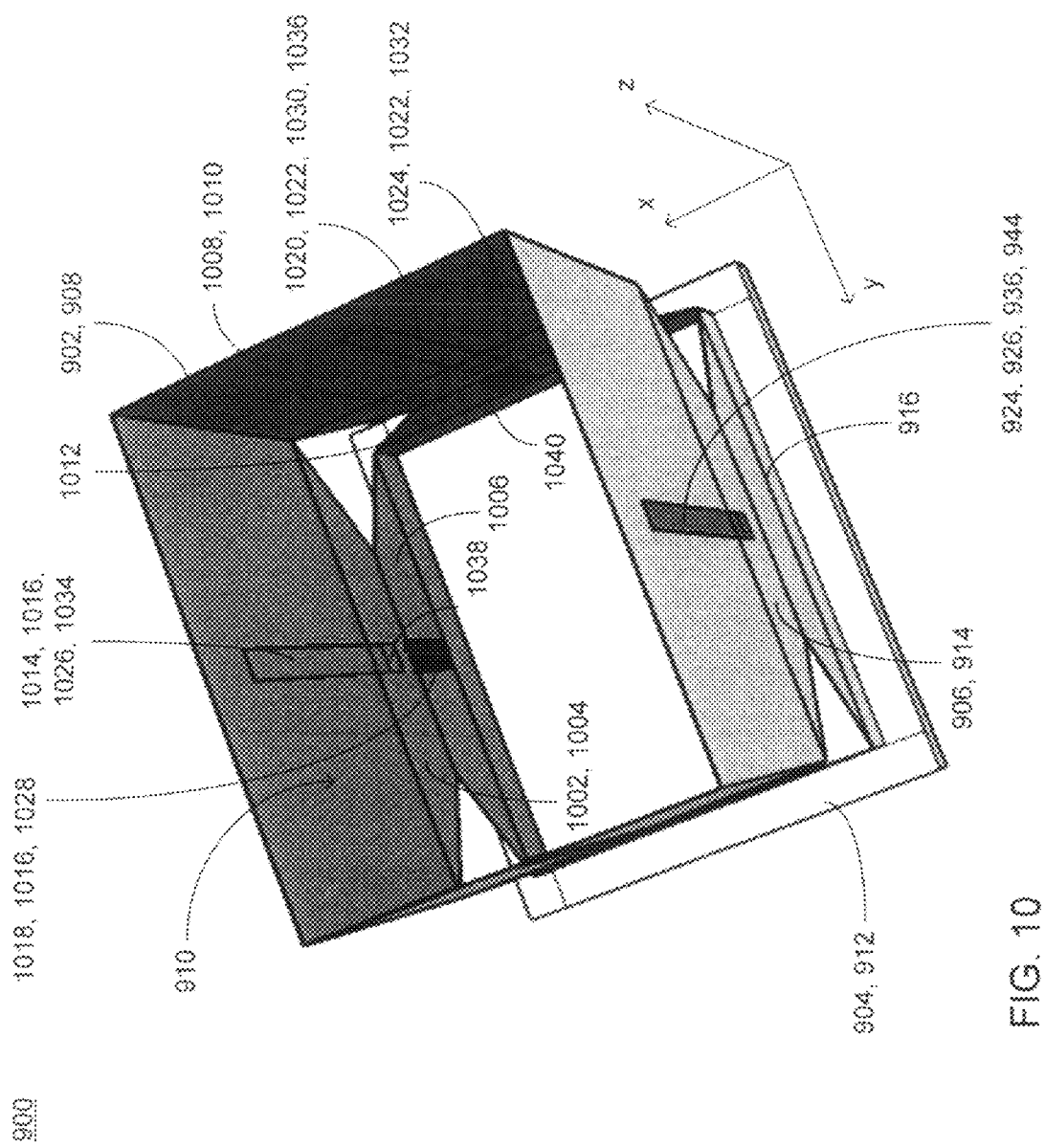
Figure 11:
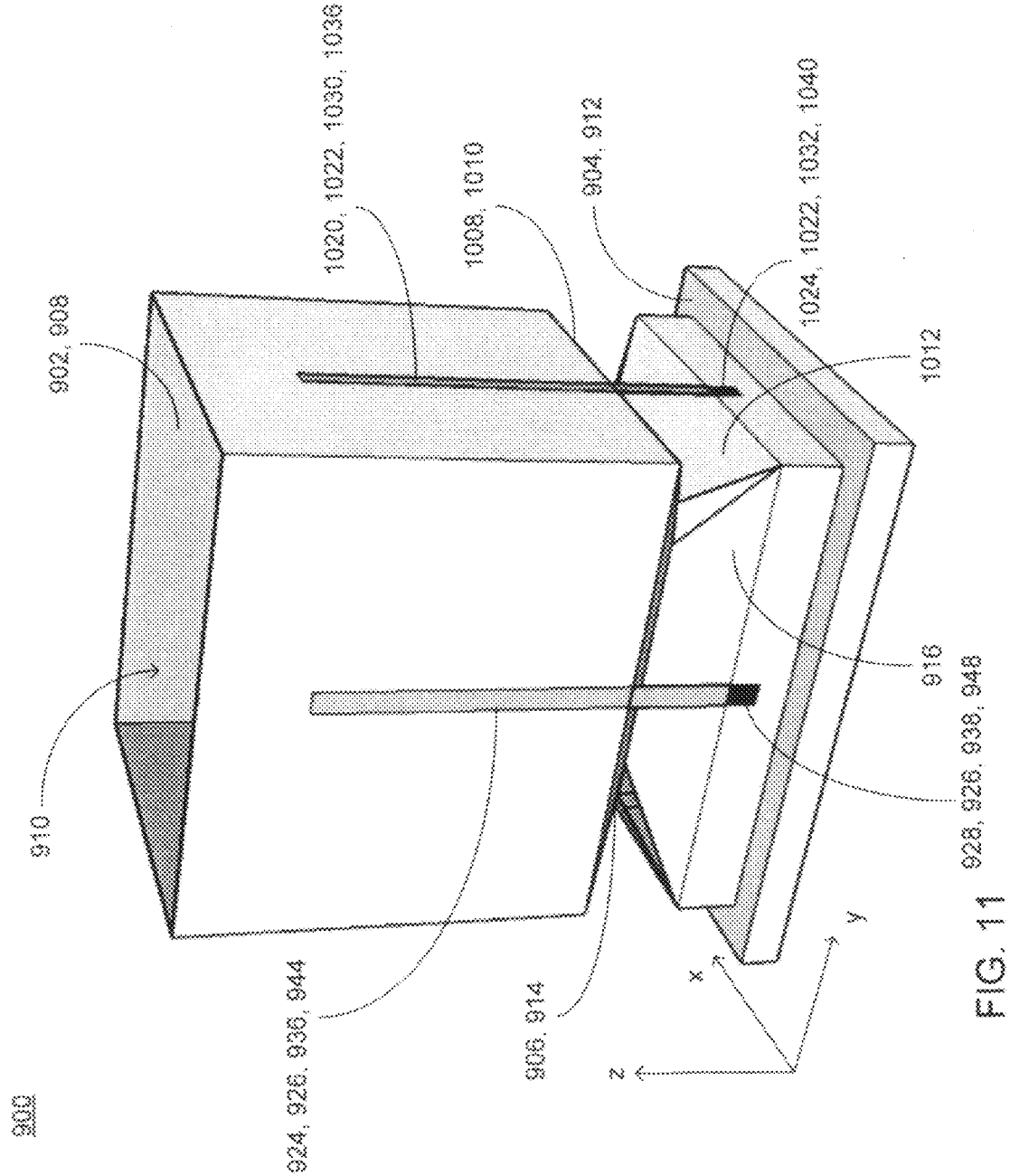
Figure 12:
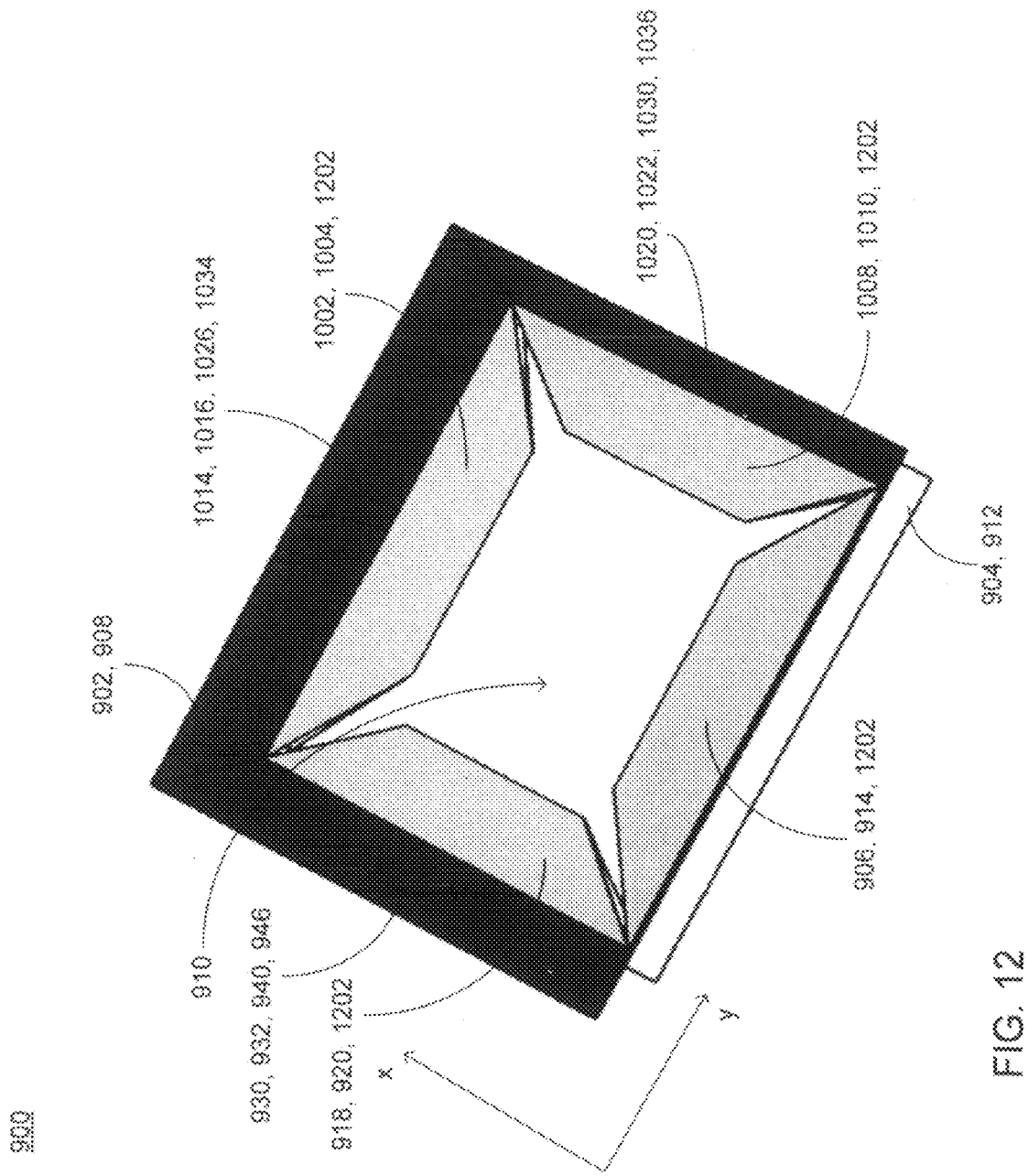
FIG. 12 illustrates a top view of a seatbelt buckle position holder, according to an embodiment.

FIGS. 9 through 11 illustrate three dimensional views of a seatbelt buckle position holder, according to embodiments. FIG. 12 illustrates a top view of a seatbelt buckle position holder, according to an embodiment.

FIG. 9 illustrates a first three dimensional view of a seatbelt buckle position holder configured to receive or to release a seatbelt buckle, according to an embodiment. FIG. 10 illustrates a second three dimensional view of a seatbelt buckle position holder configured to receive or to release a seatbelt buckle, according to an embodiment. In FIGS. 9 and 10, a seatbelt buckle position holder 900 includes a collar 902, a base 904, and a first hinge 906. Collar 902 is formed as a first enclosure 908 surrounding an aperture 910. Base 904 is formed as a second enclosure 912 surrounding aperture 910. First hinge 906 has a first wing 914 connected to collar 902 and a second wing 916 connected to base 904.

Collar 902 can be configured to support, for example, seatbelt buckle 304. For example, if an automobile seat bottom (not shown) lies substantially parallel to the x-y plane, then collar 902 can be configured to support seatbelt buckle 304 in a position other than against the automobile seat bottom. In FIGS. 9 and 10, for example, collar 902 can be configured to support seatbelt buckle 304 in a position substantially perpendicular to an automobile seat bottom (not shown). Collar 902 can also be configured to support seatbelt buckle 304 in other positions with respect to an automobile seat bottom.

Seatbelt buckle position holder 900 can further comprise a second hinge 1002. Second hinge 1002 can have a first wing 1004 connected to collar 902 and a second wing 1006 connected to base 904. Seatbelt buckle position holder 900 can further comprise a third hinge 918 and a fourth hinge 1008. Third hinge 918 can have a first wing 920 connected to collar 902 and a second wing 922 connected to base 904. Fourth hinge 1008 can have a first wing 1010 connected to collar 902 and a second wing 1012 connected to base 904.

FIG. 11 illustrates a three dimensional view of a seatbelt buckle position holder configured to support a seatbelt buckle, according to an embodiment. FIG. 12 illustrates a top view of a seatbelt buckle position holder configured to support a seatbelt buckle, according to an embodiment.

Seatbelt buckle position holder 900 is configured to receive or to release, for example, seatbelt buckle 304 when the wings of all the hinges are positioned along or external to a circumference defined by first enclosure 908. For example, in FIGS. 9 and 10, first and second wings 914 and 916, first and second wings 1004 and 1006, first and second wings 920 and 922, and first and second wings 1010 and 1012 are positioned along or external to the circumference defined by first enclosure 908. When seatbelt buckle position holder 900 is configured to receive or to release, for example, seatbelt buckle 304, aperture 910 can be sized to allow, for example, seatbelt buckle 304 and a seatbelt webbing (not shown) to pass through.

Seatbelt buckle position holder 900 is configured to support, for example, seatbelt buckle 304 when the wings of all the hinges are positioned internal to the circumference defined by first enclosure 908. For example, in FIGS. 9 and 10, first and second wings 914 and 916, first and second wings 1004 and 1006, first and second wings 920 and 922, and first and second wings 1010 and 1012 are positioned internal to the circumference defined by first enclosure 908. When seatbelt buckle position holder 900 is configured to support, for example, seatbelt buckle 304, aperture 910 can be sized to allow a seatbelt webbing (not shown) to pass through, but to prevent, for example, seatbelt buckle 304 from passing through. First wing 914, first wing 1004, first wing 920, and first wing 1010 can form a flange 1202. Flange 1202 can be configured to support, for example, seatbelt buckle 304.

In a plane substantially parallel to the x-y plane, collar 902 can have any shape such that aperture 910 is sized to allow, for example, seatbelt buckle 304 and a seatbelt webbing (not shown) to pass through. For example, in a plane substantially parallel to the x-y plane, collar 902 can have, by way of example only, and not limitation, one of a square shape, a rectangular shape, a circular shape, and an elliptical shape.

In planes substantially perpendicular to the x-y plane, collar 902 can be shaped to allow access to a release button (not shown) on seatbelt buckle 304. For example, in FIG. 3, sometimes seatbelt buckle 304 can have a release button on a face that is substantially parallel to the x-z plane. For example, collar 902 can have a cutaway portion (not shown) similar to cutaway portion 306 on first part 102. This cutaway portion can allow a user to have access to a release button on seatbelt buckle 304, for example, when seatbelt buckle 304 is being supported by seatbelt buckle position holder 900.

Base 904 can be configured to be placed in a gap formed where an automobile seat bottom (not shown) encounters an automobile seat back (not shown). For example, in FIG. 3, if an automobile seat bottom lies substantially parallel to the x-y plane and an automobile seat back lies substantially perpendicular to the x-y plane and substantially parallel to the x-axis, then a gap may exist along a line substantially parallel to the x-axis.

Base 904 can be shaped to avoid an obstruction present in at least one of an automobile seat bottom, an automobile seat back, and the gap. Sometimes, for example, the seatbelt presents such an obstruction. For example, base 904 can have at least one cutaway portion (not shown) similar to cutaway portion 310 on first part 102. Having the at least one cutaway portion positioned near the middle of a side of base 904 produces salient portions near the edges of the side of base 904. The at least one cutaway portion can allow seatbelt buckle position holder 900 to be positioned near the obstruction and still can allow salient portions of the side of base 904 to be placed in the gap.

Seatbelt buckle position holder 900 can further comprise at least one first part of at least one fastener and at least one second part of the at least one fastener. The at least one first part of the at least one fastener can be connected to collar 902. The at least one second part of the at least one fastener can be connected to base 904. In FIGS. 9 and 10, for example, a first part 924 of a first fastener 926, a first part 1014 of a second fastener 1016, a first part 930 of a third fastener 932, and a first part 1020 of a fourth fastener 1022 can be connected to collar 902. In FIGS. 9 and 10, for example, a second part 928 of first fastener 926, a second part 1018 of second fastener 1016, a second part 934 of third fastener 932, and a second part 1024 of fourth fastener 1022 can be connected to base 904.

At least one of first fastener 926, second fastener 1016, third fastener 932, and fourth fastener 1022 can be any means that connect collar 902 and base 904 including, by way of example only, and not limitation, adhesive means, a band, a strap, a staple, a screw, a pin, a nail, a peg, a grommet, a clip, a rivet, a clutch, a snap fastener, a buckle, a button, a frog, a lace, a tie, a zipper, a hinge, a clamshell, a retainer ring, a hook-and-eye closure, a hook-and-loop fastener (e.g., Velcro®), and the like. Advantageously, having all of first fastener 926, second fastener 1016, third fastener 932, and fourth fastener 1022 can contribute to the robustness of seatbelt buckle position holder 900.

For example, first part 924 can be a male part 936, first part 1014 can be a male part 1026, first part 903 can be a male part 940, and first part 1020 can be a male part 1030. For example, second part 928 can be a female part 938, second part 1018 can be a female part 1028, second part 934 can be a female part 942, and second part 1024 can be a female part 1032. Male part 936 can be configured to connect to female part 938, male part 1026 can be configured to connect to female part 1028, male part 940 can be configured to connect to female part 942, and male part 1030 can be configured to connect to female part 1032. In this manner, first and second wings 914 and 916, first and second wings 1004 and 1006, first and second wings 920 and 922, and first and second wings 1010 and 1012 can be positioned internal to the circumference defined by first enclosure 908 so that first wing 914, first wing 1004, first wing 920, and first wing 1010 can form flange 1202 so that aperture 910 can be sized to allow a seatbelt webbing (not shown) to pass through, but to prevent, for example, seatbelt buckle 304 from passing through.

Male part 936 can have a portion 944 substantially elongated along an axis. Male part 1026 can have a portion 1034 substantially elongated along an axis. Male part 940 can have a portion 946 substantially elongated along an axis. Male part 1030 can have a portion 1036 substantially elongated along an axis. In FIGS. 9 and 10, for example, portions 944, 1034, 946, and 1036 are substantially elongated along a line substantially parallel to the z-axis.

Portion 944 can have a protrusion 948 substantially perpendicular to the axis. Portion 1034 can have a protrusion 1038 substantially perpendicular to the axis. Portion 946 can have a protrusion 950 substantially perpendicular to the axis. Portion 1036 can have a protrusion 1040 substantially perpendicular to the axis. In FIGS. 9 and 10, for example, protrusion 948 protrudes from portion 944 substantially along a line parallel to the y-axis, which is perpendicular to the z-axis; protrusion 1038 protrudes from portion 1034 substantially along a line parallel to the y-axis, which is perpendicular to the z-axis; protrusion 950 protrudes from portion 946 substantially along a line parallel to the x-axis, which is perpendicular to the z-axis; and protrusion 1040 protrudes from portion 1036 substantially along a line parallel to the x-axis, which is perpendicular to the z-axis.

Portion 944 can be made of an elastic material that is configured to bend to allow protrusion 948 to connect to female part 938. FIG. 11, for example, illustrates protrusion 948 connected to female part 938. Portion 1034 can be made of an elastic material that is configured to bend to allow protrusion 1038 to connect to female part 1028. Portion 946 can be made of an elastic material that is configured to bend to allow protrusion 950 to connect to female part 942. Portion 1036 can be made of an elastic material that is configured to bend to allow protrusion 1040 to connect to female part 1032. FIG. 11, for example, illustrates protrusion 1040 connected to female part 1032.

Male part 936 can be releasable from female part 938, male part 1026 can be releasable from female part 1028, male part 940 can be releasable from female part 942, and male part 1030 can be releasable from female part 1032. In this manner, first and second wings 914 and 916, first and second wings 1004 and 1006, first and second wings 920 and 922, and first and second wings 1010 and 1012 can be positioned along or external to the circumference defined by first enclosure 908 so that aperture 910 can be sized to allow, for example, seatbelt buckle 304 and a seatbelt webbing (not shown) to pass through.

The embodiments of the seatbelt buckle position holders described herein can be made from at least one material that has the physical properties needed for the functions of the seatbelt buckle position holders. The at least one material can be, by way of example only, and not limitation, at least one of polypropylene, polyethylene, acrylonitrile butadiene styrene, and glass-filled nylon.

The embodiments of the seatbelt buckle position holders described herein can be manufactured by any of a variety of processes that produces seatbelt buckle position holders having the features described herein. By way of example only, and not limitation, the embodiments of the seatbelt buckle position holders described herein can be manufactured by an injection molding process.

While various embodiments are disclosed herein, it should be understood that they have been presented by way of example only, and not limitation. It will be apparent to persons skilled in the relevant art that various changes in form and detail may be made therein without departing from the spirit and scope of the embodiments disclosed herein. Thus, the breadth and scope of the claims should not be limited by any of the exemplary embodiments disclosed herein.

What is claimed is:

1. A first part of a seatbelt buckle position holder to facilitate access to a seatbelt buckle, comprising:
    a first part of a collar;
    a first part of a first fastener connected to the first part of the collar;
    a first part of a base connected to the first part of the collar, having a substantially planar shape to be placed in a gap formed where an automobile seat bottom encounters an automobile seat back; and
    a pin connected to the first part of the base;
    wherein the first part of the seatbelt buckle position holder is to be connected to a second part of the seatbelt buckle position holder to form the seatbelt buckle position holder, the second part of the seatbelt buckle position holder an identical duplicate of the first part of the seatbelt buckle position holder and including a second part of the collar, a second part of the first fastener, a second part of the base, and a socket connected to the second part of the base, wherein the pin of the first part of the base is to engage with the socket of the second part of the base.

2. The first part of the seatbelt buckle position holder of claim 1, wherein the first part of the collar is configured to support a seatbelt buckle in a position other than against an automobile seat bottom.

3. The first part of the seatbelt buckle position holder of claim 2, wherein the position is substantially perpendicular to the automobile seat bottom.

4. The first part of the seatbelt buckle position holder of claim 1, wherein the first part of the collar is shaped to allow access to a release button on a seatbelt buckle.

5. The first part of the seatbelt buckle position holder of claim 1, wherein the base is shaped to avoid an obstruction present in at least one of the automobile seat bottom, the automobile seat back, and the gap.

6. The first part of the seatbelt buckle position holder of claim 1, further comprising: a flap connected to the base to help support a seatbelt buckle.

7. The first part of the seatbelt buckle position holder of claim 1, further comprising:
    a socket connected to the first part of the base, the socket to be engaged with a pin connected to the second part of the base of the second part of the seatbelt buckle position holder.

8. The first part of the seatbelt buckle position holder of claim 1, wherein the first part of the first fastener is to connect to the second part of the first fastener connected to the second part of the seatbelt buckle position holder.

9. The first part of the seatbelt buckle position holder of claim 8, wherein the first part of the first fastener is releasable from the second part of the first fastener.

10. The first part of the seatbelt buckle position holder of claim 9, wherein a portion of the first part of the first fastener is made of an elastic material.

11. The first part of the seatbelt buckle position holder of claim 8, wherein the first part of the first fastener is a male part and the second part of the first fastener is a female part.

12. The first part of the seatbelt buckle position holder of claim 8, wherein the first part of the first fastener is a female part and the second part of the first fastener is a male part.

13. The first part of the seatbelt buckle position holder of claim 8, wherein the first part of the first fastener is adjustably connectable to the second part of the first fastener to allow various degrees of separation between the first part of the collar and a second part of the collar of the second part of the seatbelt buckle position holder when the first part of the seatbelt buckle position holder is connected to the second part of the seatbelt buckle position holder in a closed position.

14. The first part of the seatbelt buckle position holder of claim 1, further comprising:
    a part of a second fastener connected to the first part of the collar.

15. The first part of the seatbelt buckle position holder of claim 1, further comprising:
    a flap connected to the first part of the collar to help support a seatbelt buckle.

16. The first part of the seatbelt buckle position holder of claim 15, wherein the flap has a textured surface to help support the seatbelt buckle.

17. The first part of the seatbelt buckle position holder of claim 1, wherein the first part of the seatbelt buckle position holder is made of at least one of polypropylene, polyethylene, acrylonitrile butadiene styrene, and glass-filled nylon.

18. A first part of a seatbelt buckle position holder to facilitate access to a seatbelt buckle, comprising:
    a first part of a collar;
    a first part of a base connected to the first part of the collar; and
    a in connected to the first part of the base,
    wherein the first part of the seatbelt buckle position holder is to be connected to a second part of the seatbelt buckle position holder to form the seatbelt buckle position holder, the second part of the seatbelt buckle position holder an identical duplicate of the first part of the seatbelt buckle position holder and including a second part of the collar, a second part of the base, and a socket connected to the second part of the base, wherein the in of the first part of the base is to engage with the socket of the second part of the base.

19. The first part of the seatbelt buckle position holder of claim 18, wherein the base has a substantially planar shape to be placed in a gap formed where an automobile seat bottom encounters an automobile seat back.

20. The first part of the seatbelt buckle position holder of claim 1, wherein the first part of the seatbelt buckle position holder is optionally connected to the second part of the seatbelt buckle position holder via a divider to be fastened to both the first part of the seatbelt buckle position holder and the second part of the seatbelt buckle position holder to form two apertures to support two adjacent seatbelt buckles.

21. The first part of the seatbelt buckle position holder of claim 1, wherein the base is shaped to form a flange such that a size of an aperture formed when the first part of the seatbelt buckle position holder is connected to the second part of the seatbelt buckle position holder is reduced at the base.

22. A seatbelt buckle position holder to facilitate access to a seatbelt buckle, comprising:
    a first part including
        a first part of a collar;
        a first part of a base connected to the first part of the collar, having a substantially planar shape to be placed in a gap formed where an automobile seat bottom encounters an automobile seat back; and
        a pin connected to the first part of the base; and
    a second part that is an identical duplicate of the first part that includes
        a second part of the collar;
        a second part of the base connected to the second part of the collar; and
        a socket connected to the second part of the base,
    wherein the first part of the seatbelt buckle position holder is connectable to the second part of the seatbelt buckle position holder by engaging the pin and socket of the base.

23. The seatbelt buckle position holder of claim 22, wherein:
    the first part of the seatbelt buckle position holder further includes a first part of a fastener connected to the first part of the collar; and
    the second part of the seatbelt buckle position holder further includes a second part of the fastener connected to the second part of the collar,
    wherein the first part of the seatbelt buckle position holder is further connectable to the second part of the seatbelt buckle position holder by engaging the first part of the fastener with the second part of the fastener.

* * * * *